(No Model.)

W. G. GRIMM.
HANDLE FOR CARRYING BUNDLES, &c.

No. 275,902. Patented Apr. 17, 1883.

WITNESSES:
A. P. Grant,
W. F. Kircher.

INVENTOR:
Wm. G. Grimm,
BY John A. Wiedersheim.
ATTORNEY.

UNITED STATES PATENT OFFICE.

WILLIAM G. GRIMM, OF PHILADELPHIA, PENNSYLVANIA.

HANDLE FOR CARRYING BUNDLES, &c.

SPECIFICATION forming part of Letters Patent No. 275,902, dated April 17, 1883.

Application filed September 23, 1882. (No model.)

*To all whom it may concern:*

Be it known that I, WILLIAM G. GRIMM, a citizen of the United States, residing in the city and county of Philadelphia, State of Pennsylvania, have invented a new and useful Improvement in Handles for Carrying Baskets, Bundles, &c., which improvement is fully set forth in the following specification and accompanying drawings, in which—

Figure 1:
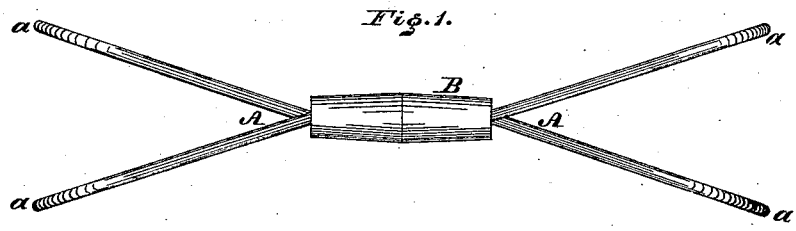
Figure 2:
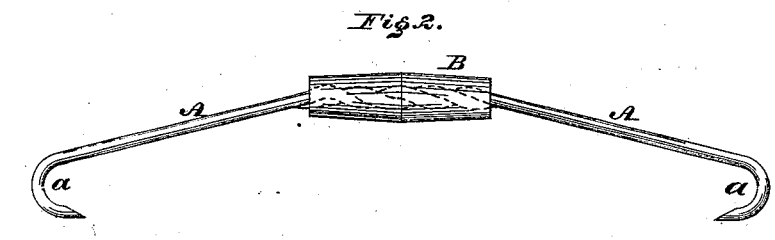
Figure 3:
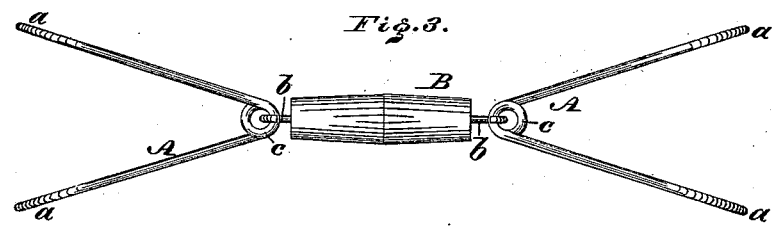
Figure 4:
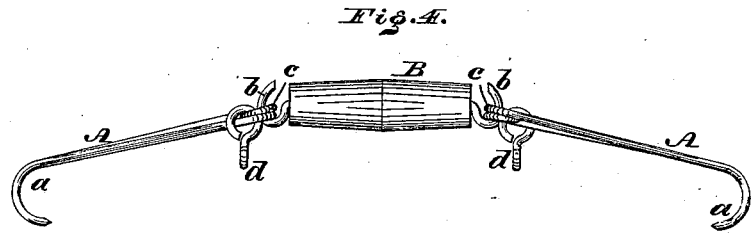

Figures 1 and 3 are top or plan views of the handle embodying my invention. Fig. 2 is a side elevation of Fig. 1. Fig. 4 is a side elevation of Fig. 3.

Similar letters of reference indicate corresponding parts in the several figures.

The nature of my invention is a handle which may be readily attached to the top of a basket, &c., not provided with a fixed handle, and, when not required, may be removed and remains in condition for further use.

The invention consists of two hooked arms, which are centrally connected, and provided with a handle, and have their ends flaring or spread, so that the arms at each end may be affixed to the basket at different points, whereby the arms will not turn, and as they may be sprung into position a firm and secure device is presented for carrying a basket, bundle, or other article not provided with a handle, or at least with a handle which may be carried by one hand.

Referring to the drawings, A represents two pieces of wire, forming arms, which are centrally connected by twisting, soldering, &c., and have their ends flaring or spread, the extreme ends being bent or hook-shaped, as at *a*. The central place of meeting or connection of the wires is encircled by a block or handle, B, of wood or other suitable material, which provides convenient means for carrying the arms, and avoids contact of the hand with the metal of the wire; but the central place of connection of the two wires may constitute a handle, that shown by the dotted lines, Fig. 2, being twisted.

It will be seen that the arms, owing to their elasticity, may be sprung over the top edge or brim of the basket, whereby the hooked ends *a* take firm hold of the sides of the basket, or engage under the brim; or the ends may be introduced through the handle-openings employed in fruit and vegetable baskets, and thus connect with the sides of the basket. Furthermore, the arms may be spread, so as to have two points of contact at each end with the basket, whereby the arms are prevented from turning or shifting, and increased security of attachment of the device with the basket is produced. In this position of the arms the block or handle B proper may be grasped, and the basket thereby carried in a most convenient manner.

When the handle is not required the arms may be disengaged by compressing the basket or otherwise manipulating the arms, and the device may be stowed away, and in condition for subsequent use, it being found especially serviceable for baskets generally termed "bushel baskets," the inconvenience of carrying which is well known, and which is obviated by my invention.

In Figs. 3 and 4 I show the arms detachable from the handle B, in which case the wire which passes through the handle has a hook or eye, *b*, on each end, and each of the arms has at its inner end an eye or hook, *c*, which may be fitted on the hook or eye *b*.

To the eye or hook *c* are attached links *d*, which may be connected with the hook or eye *b*, whereby the device may be lengthened, and thus applied to large baskets, &c. When the arms are not required they may be removed from the handle and all parts folded in compact form.

Having thus described my invention, what I claim as new, and desire to secure by Letters Patent, is—

1. The improved attachable and detachable handle, consisting of two connected arms having hooked ends at each extremity and a handle, substantially as and for the purpose set forth.

2. The connected arms, each with hooked ends, having said ends flaring or spread, and a handle, combined and operating substantially as and for the purpose set forth.

WM. G. GRIMM.

Witnesses:
JOHN A. WIEDERSHEIM,
A. P. GRANT.